Oct. 9, 1956

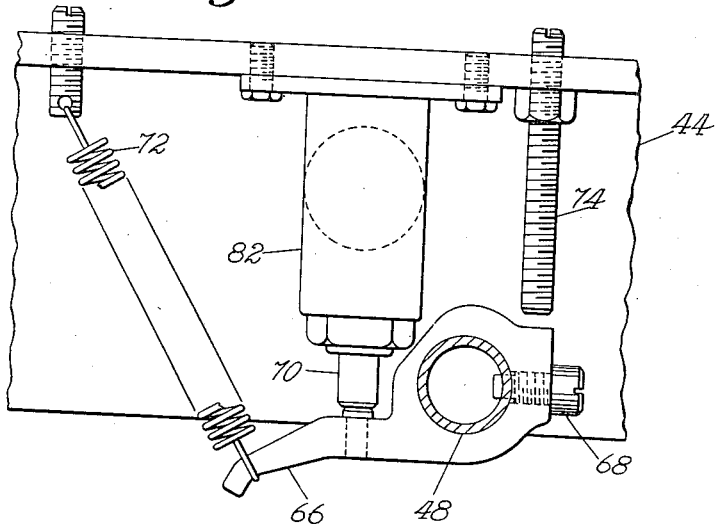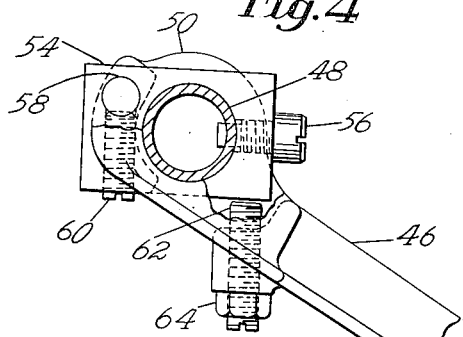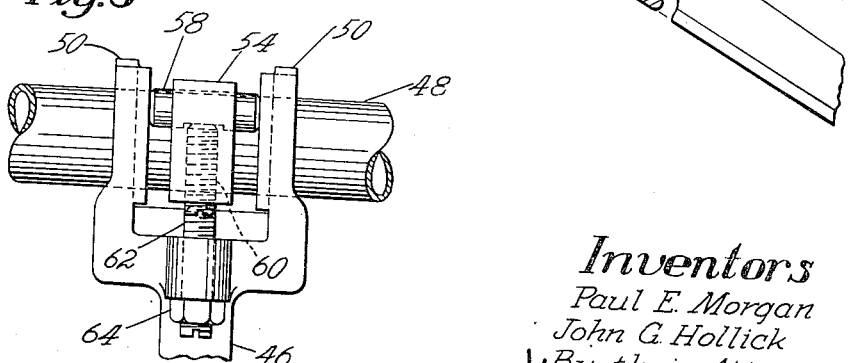

P. E. MORGAN ET AL
LEADING-EDGE-TRAILING-EDGE DETECTOR MEANS
FOR IRREGULARLY SHAPED WORK PIECES 2,766,045

Filed Nov. 17, 1953

Inventors
Paul E. Morgan
John G. Hollick
By their Attorney

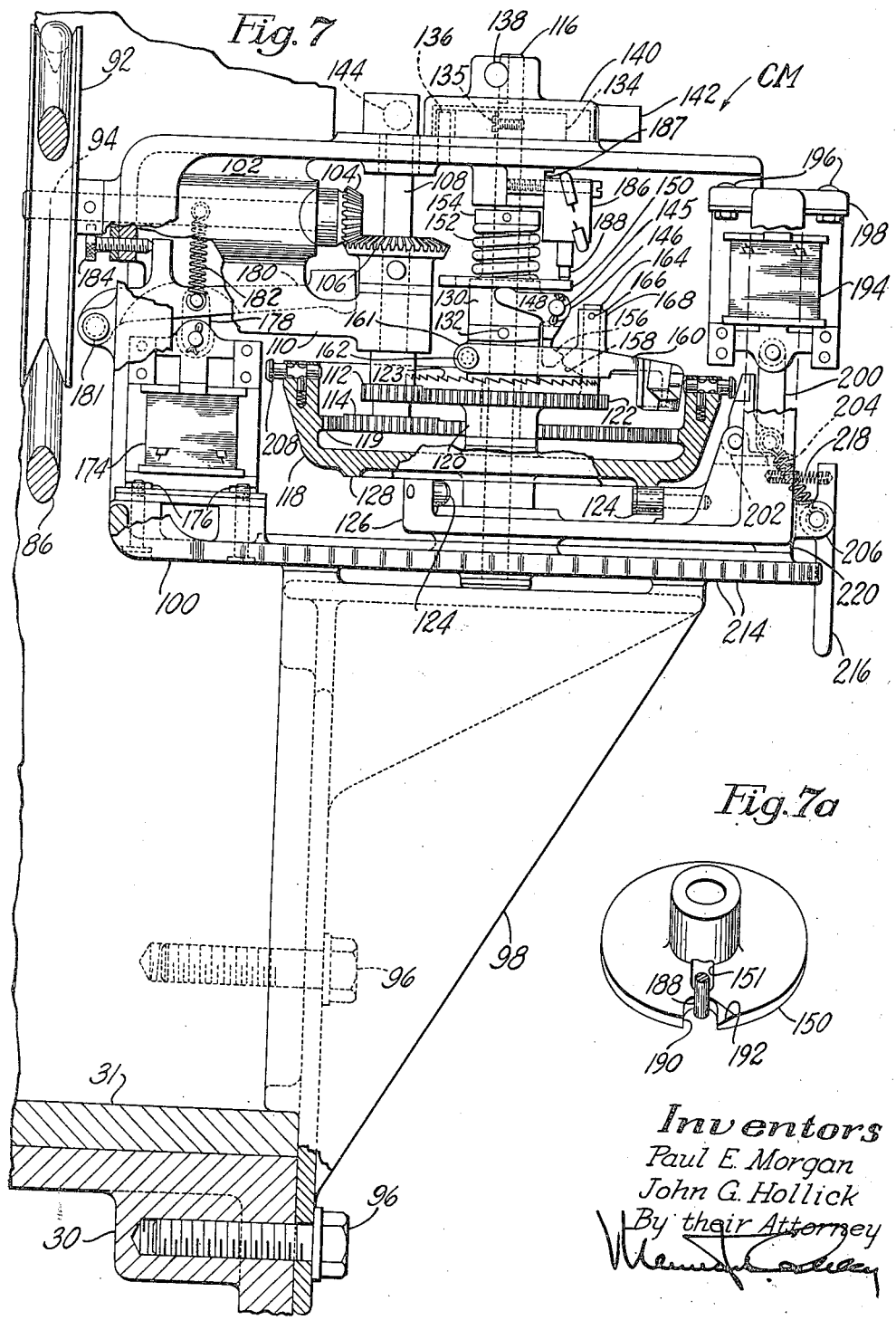

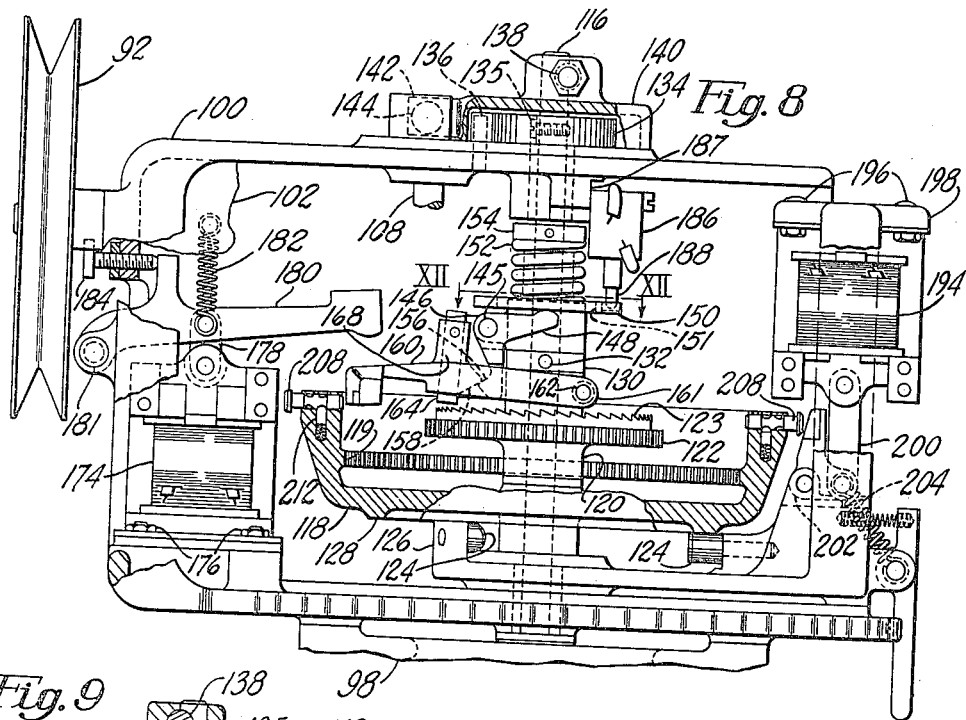
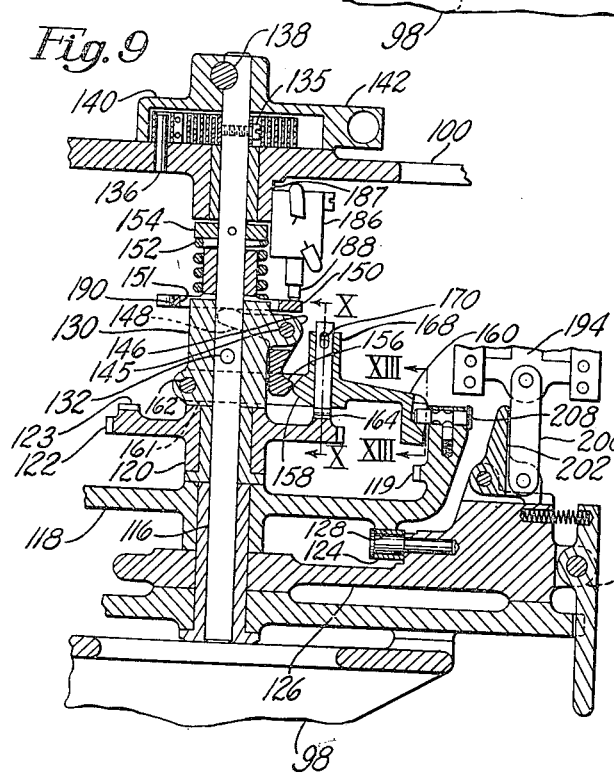
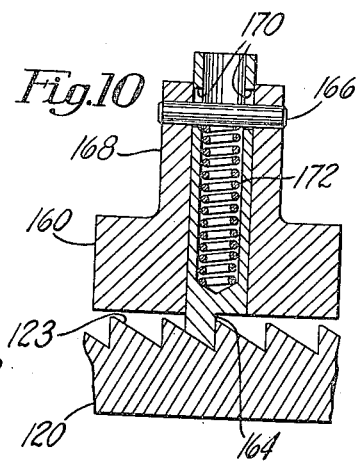
Inventors
Paul E. Morgan
John G. Hollick
By their Attorney

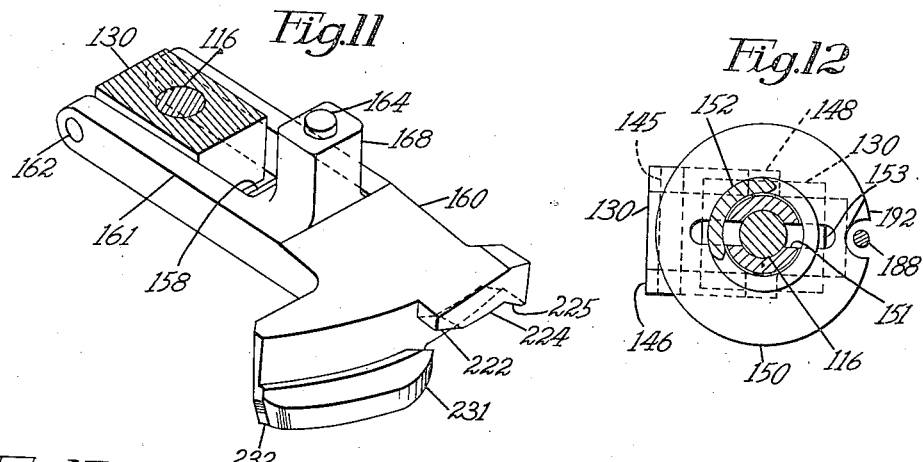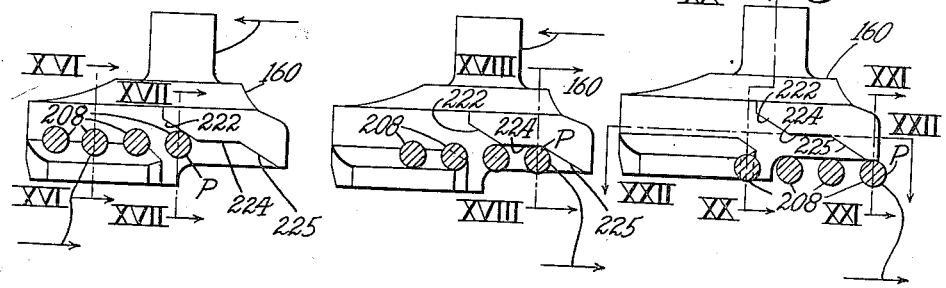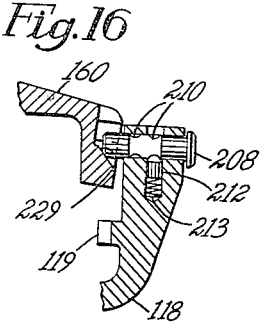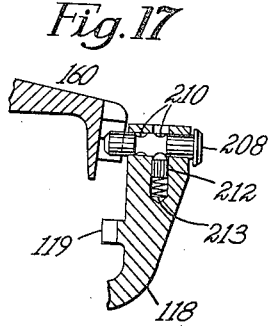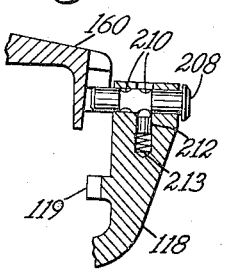

Oct. 9, 1956
P. E. MORGAN ET AL
2,766,045
LEADING-EDGE-TRAILING-EDGE DETECTOR MEANS
FOR IRREGULARLY SHAPED WORK PIECES
Filed Nov. 17, 1953
11 Sheets-Sheet 8
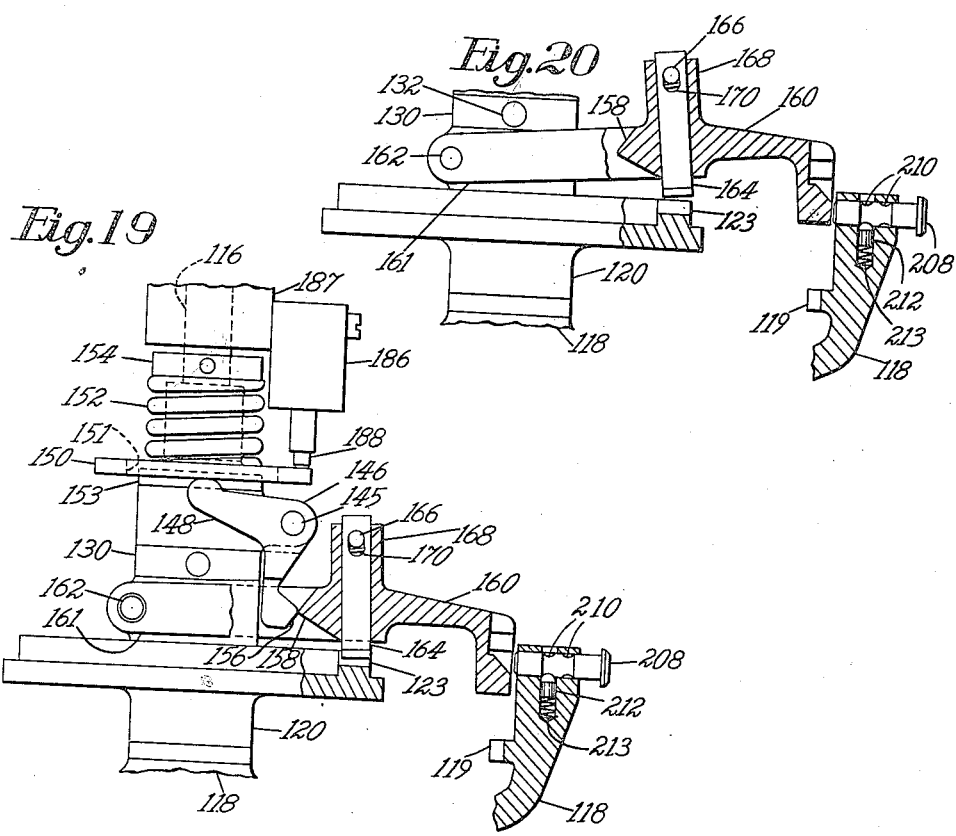
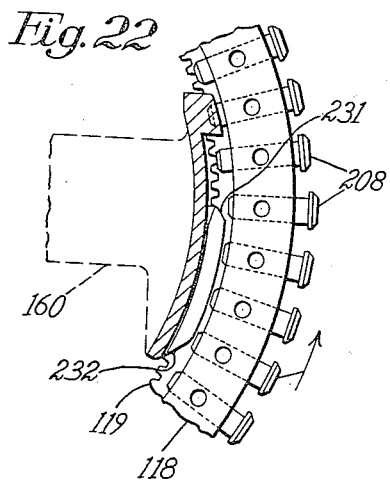
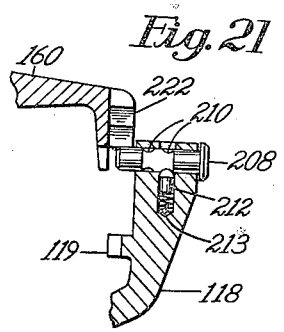
Inventors
Paul E. Morgan
John G. Hollick
By their Attorney Oct. 9, 1956

P. E. MORGAN ET AL 2,766,045

LEADING-EDGE-TRAILING-EDGE DETECTOR MEANS
FOR IRREGULARLY SHAPED WORK PIECES

Filed Nov. 17, 1953

Inventors
Paul E. Morgan
John G. Hollick
By their Attorney

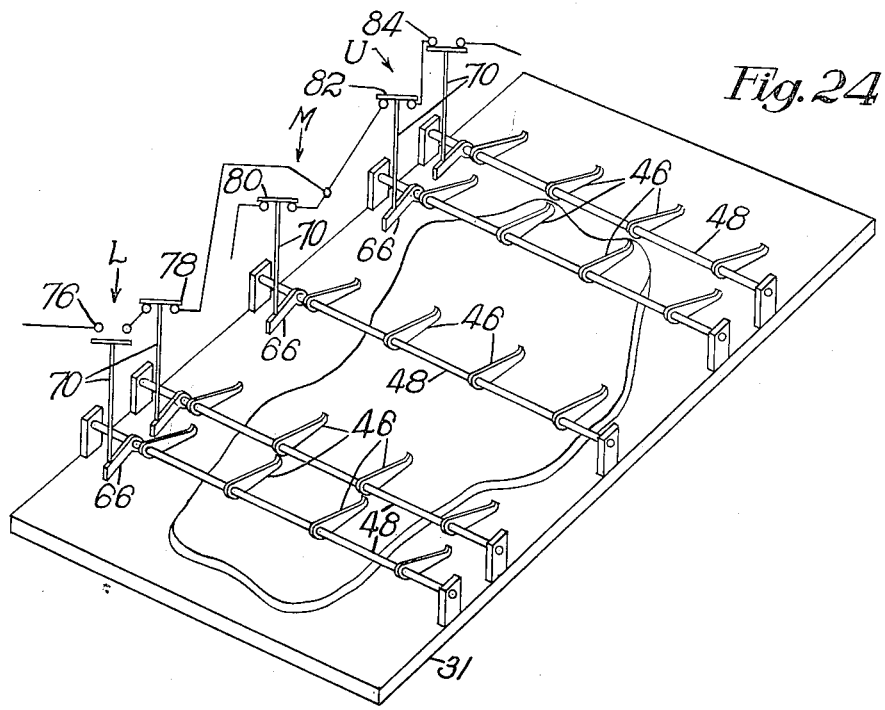
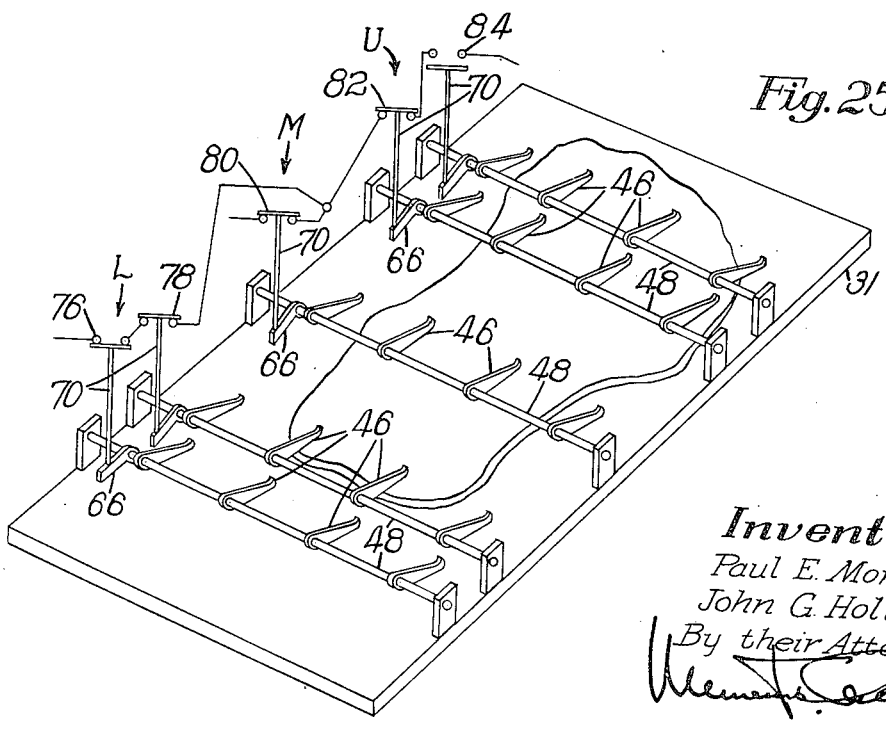

Oct. 9, 1956
P. E. MORGAN ET AL
2,766,045
LEADING-EDGE-TRAILING-EDGE DETECTOR MEANS
FOR IRREGULARLY SHAPED WORK PIECES
Filed Nov. 17, 1953
11 Sheets-Sheet 11
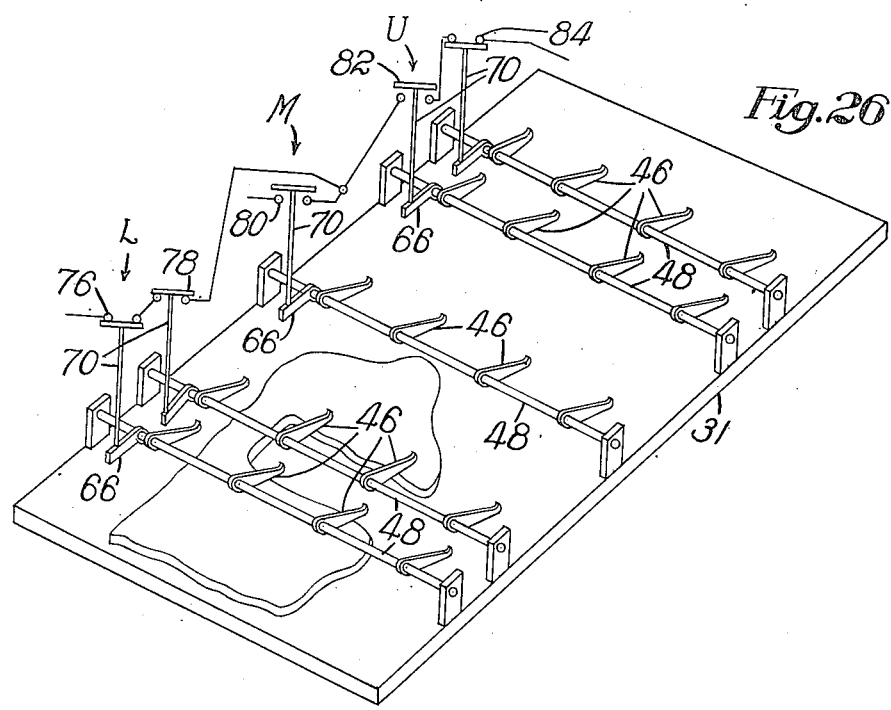
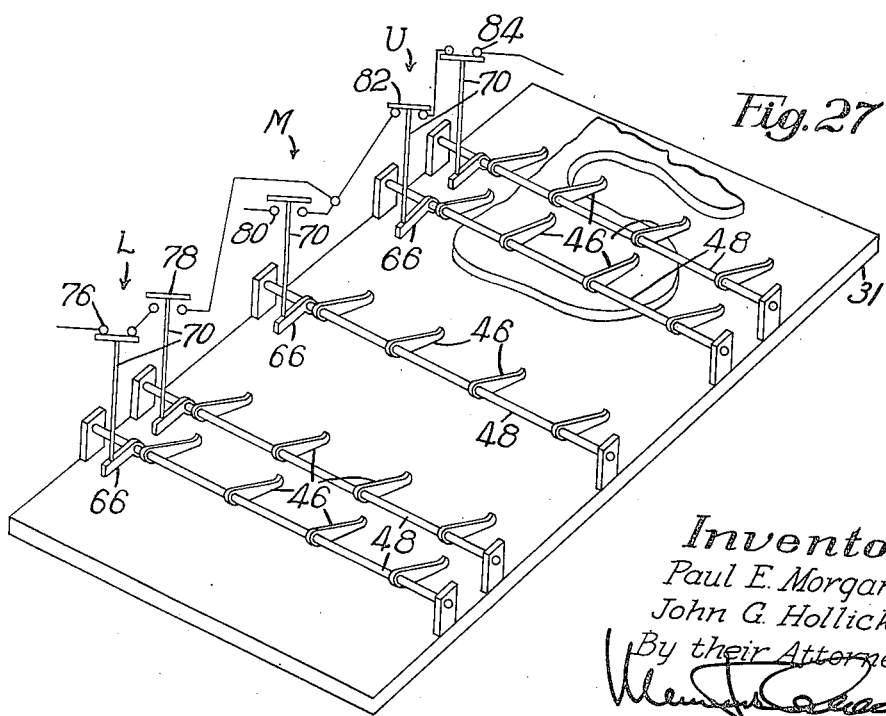
Inventors
Paul E. Morgan
John G. Hollick
By their Attorney

United States Patent Office 2,766,045
Patented Oct. 9, 1956

2,766,045

LEADING-EDGE-TRAILING-EDGE DETECTOR MEANS FOR IRREGULARLY SHAPED WORK PIECES

Paul E. Morgan, Melrose, and John G. Hollick, Beverly, Mass., assignors to United Shoe Machinery Corporation, Flemington, N. J., a corporation of New Jersey Application November 17, 1953, Serial No. 392,546

5 Claims. (Cl. 271—68)

The present invention relates to an improvement in detecting means of the type disclosed in United States Letters Patent No. 2,743,925, granted May 1, 1956, in the names of Richard M. Elliott et al. for sensing the passage of the leading and trailing edges of a conveyed work piece. The present invention is shown in association with a control mechanism described in application for United States Letters Patent Serial No. 376,623, filed August 26, 1953, in the name of John J. Maciejowski for the operation of an automatic leather stacking machine of the type described in United States Letters Patent No. 2,737,390, granted March 6, 1956, in the names of Paul E. Morgan et al. However, the present invention is not limited to use with this particular control mechanism nor with leather stacking machines generally.

The detector means disclosed in the above-mentioned Patent No. 2,743,925 provides an excellent means for selectively sensing the passage of the leading or trailing edges of a conveyed work piece by the use of a series of detector fingers spaced across the path of travel of a work piece. In the leather industry it is necessary to handle highly irregularly shaped work pieces. The most serious problems are presented by so-called hooked neck work pieces. These pieces have a main body portion and a head portion which are connected by a very thin section of material. This incidentally is caused by the manner of butchering the animal. As the work piece is conveyed, it is possible for this thin section to pass between the detector stations so that the head portion and the body portion are then detected separately as two distinct work pieces. The portion connecting the head portion and the body portion is many times so narrow that it would be impractical to space detector fingers close enough together to avoid a false detection.

It is an object of the present invention to provide means for preventing the false detection of the leading and trailing edges of a highly irregularly shaped work piece.

It is a further object of the present invention to provide detector means which are simple and economical of construction.

More particularly and in accordance with the various features of the present invention, an upper and lower detector station of the type disclosed in the mentioned Patent No. 2,743,925 are provided. Each station comprises a multiplicity of fingers arranged in pairs and spaced across the path of travel of the work pieces each of said fingers being capable of operating a switch. The upper station is arranged so that as a work piece is conveyed the foremost portion of the work piece when it raises the lower switch in said pairs, causes a switch to close and a circuit to be completed thereby. Continued motion of the work piece causes the upper finger in a pair to rise and open a switch connected in series with the switch which had just been closed. Thus the passage of the leading edge is indicated by a momentary completion of a circuit incorporating these switches. In a similar manner the lower detector station is arranged so that the passage of the trailing edge of the conveyed work piece will cause a momentary completion of a circuit including switches controlled by said lower station. According to the features of the present invention a third detector station is provided intermediately between the upper and lower detector stations. This station likewise has fingers spaced across the path of travel of the work piece any one of which may operate a switch when displaced by the presence of a work piece beneath it. The switch controlled by the fingers of the middle detector station is connected in series with the switches of both the upper and lower detector stations. Therefore, it is impossible for the sensing circuit to be completed unless a portion of the work piece is also located beneath the middle detector station.

New means are provided for the mounting of the fingers and the actuation of the switches thereby. Each finger is mounted upon a bar located above the path of travel of the work pieces. An arm is interposed between tabs formed on the fingers. The arm is secured to the bar and the fingers are freely mounted on the bar by means of these tabs. In this manner as the leather passes the fingers and engages only one of the fingers it is necessary for the work piece to overcome the resistance of that one finger, the bar and the short arms but not the resistance or weight of all the fingers spaced along the bar. A switch is mounted adjacent one end of each bar. A lever which is rigidly secured to the bar normally maintains the plunger of the switch in a compressed condition against the action of the internal spring provided therein. The contacts of the switch may either be normally open or normally closed. Thus the internal spring pressure of the switch may act as a counterweight for the weight of the detector fingers, the bar and the arms. In this manner the pressure to lift any one or all of the fingers is reduced to an absolute minimum. With the plunger of the switch normally depressed it is possible to accommodate wide thickness variations, as where a work piece is folded, since the lever secured to the bar moves away from the switch. To assist in maintaining a proper balance of forces a further spring may be provided to act against the force of the internal spring of the switch.

Means are also provided for adjusting the lateral position of the detector fingers along the bar. These means are especially adapted to enable the use of a hollow bar so that the weight of the detector system and the inertia which must be overcome in raising the finger is reduced to a minimum.

The above and other features of the invention including various novel details of construction and combination of parts will now be more particularly described with reference to the accompanying drawings and pointed out in the claims.

In the drawings:

Fig. 3 is a view partially in section and on a further enlarged scale taken along the line III—III in Fig. 2 and looking in the direction of the arrows;

Fig. 4 is a view partially in section taken along the line IV—IV in Fig. 2 and looking in the direction of the arrows;

Fig. 5 is a view in elevation of the elements shown in Fig. 4;

Figure 23:
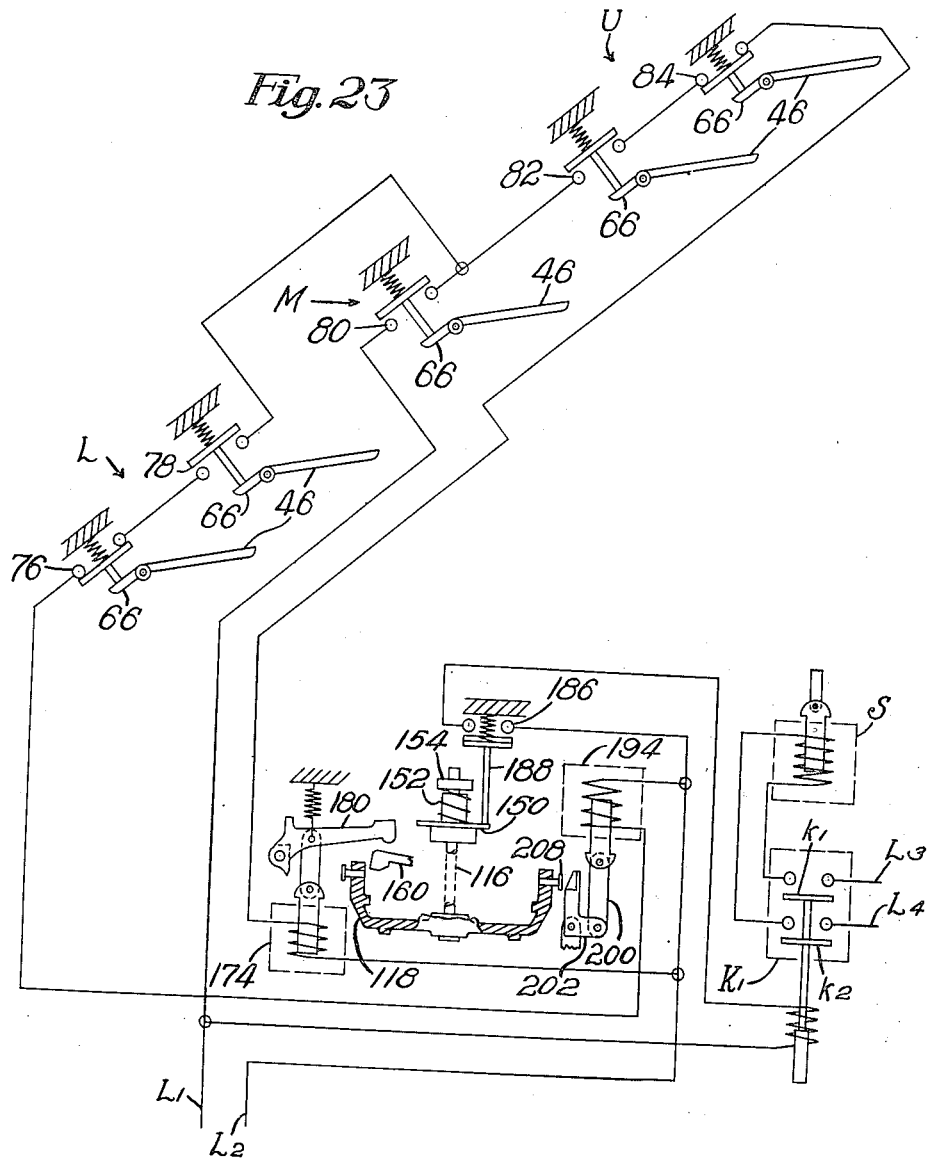

Fig. 7 is a view in front elevation of the control mechanism with certain parts broken away and others shown in section and shown during a cycle of its operation;

Fig. 7a is a view in perspective and on a further enlarged scale of certain elements shown in Fig. 7;

Fig. 8 is a view similar to Fig. 7 with further parts being broken away showing the elements of the mechanism in their rest position;

Fig. 9 is a partial view fully in section of elements shown in Fig. 7 fully in cross section;

Fig. 10 is a view in section on a further enlarged scale taken on the line X—X in Fig. 9 and looking in the direction of the arrows;

Fig. 11 is a view in perspective of one of the operating elements of the mechanism;

Fig. 12 is a view in section taken along the line XII—XII in Fig. 8 and looking in the direction of the arrows;

Figs. 13, 14 and 15 are views partially in section taken along the line XIII—XIII in Fig. 9 and looking in the direction of the arrows showing the relative locations of certain elements during the operation of the mechanism;

Fig. 16 is a view in section taken along the line XVI—XVI in Fig. 13 and looking in the direction of the arrows;

Fig. 17 is a view in section taken along the line XVII—XVII in Fig. 13 and looking in the direction of the arrows;

Fig. 18 is a view in section taken along the line XVIII—XVIII in Fig. 14 and looking in the direction of the arrows;

Fig. 19 is a partial view of the elements shown in Fig. 7 taken when the elements are in the position shown in Fig. 14;

Fig. 20 is a partial view of the elements shown in Fig. 19 taken when they are in the relative position shown in Fig. 15 and along the line XX—XX in that figure;

Fig. 21 is a view in section taken along the line XXI—XXI in Fig. 15 and looking in the direction of the arrows;

Fig. 22 is a view in section taken along the line XXII—XXII in Fig. 15 and looking in the direction of the arrows;

Fig. 23 is a schematical representation of the electrical components of the present invention; and Figs. 24, 25, 26 and 27 are schematical representations of the detector system used herein showing the elements in various stages of operation.

Automatic leather stacking machines of the type in which the present invention is incorporated have a fabricated framework 30 (Fig. 1) and a platform 31 supporting a conveyor system comprising two sets of belts 32, 34 spaced across the width of the machine (Fig. 18) which carry consecutive work pieces W upwardly to a pivot roll 36 where a third set of belts 37 cooperates to carry them downwardly along a swinging arm 38, discharging the work pieces from said arm at an exit portion indicated by the arrow B. The swinging arm 38 is oscillated in time relationship to the passage of the work piece W so that the work pieces are draped equally on either side of a supporting horse H. It has been found necessary to initiate the oscillatory motion of the arm 38 when the midpoint of the work piece reaches a point along said arm (conveniently referred to as point X). When the midpoint of any length of work piece has reached that point, the oscillatory motion is imparted by a hydraulic system the operation of which is initiated by a solenoid S. Reference is made to the above-mentioned Patent No. 2,737,390 for details of construction and operation of the leather stacking machine, except for the operation of the control system for completing the circuit to the solenoid S in proper time relationship to the passage of a work piece which forms the present invention.

Spaced along the upper surface of the frame 30 are three detector stations L, M and U the lower station L being arranged to detect selectively the trailing edge of a conveyed work piece and the upper station U selectively to detect the passage of the leading edge of a conveyed work piece, and the station M being provided to prevent a false detection being made by either the stations L or U where work pieces have holes therein or have so-called hook necks. When the stations L and U detect the trailing and leading edges respectively, electrical impulses are transmitted to a control mechanism CM thereby actuating mechanism therein causing the circuit for the solenoid S to be completed and the arm 38 to be oscillated when the midpoint of the work piece reaches point X. The general principles of operation of the control mechanism CM are the same as those explained in United States Letters Patent No. 2,743,295, granted May 1, 1956, in the names of Richard M. Elliott, et al., and reference is made thereto for a fuller explanation of these principles, which briefly comprise the exhaustion of a quantity, a distance in this case, by two means actuated by the passage of a work piece and the rate of exhaustion of each means being proportional to the rate of the work piece.

Figure 1:
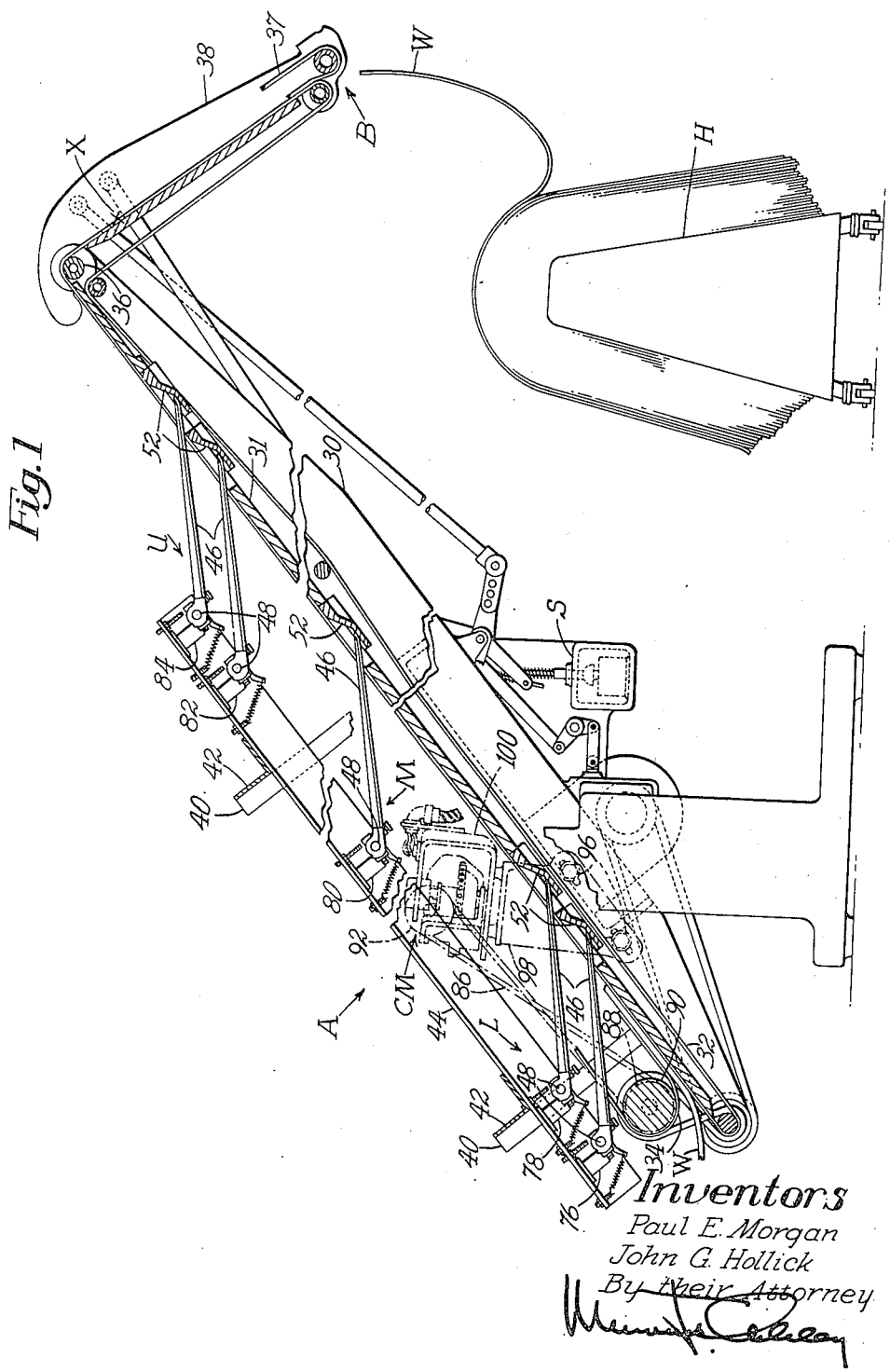
Fig. 1 is a view in side elevation of a leather stacking machine, with certain parts broken away and others shown in section, in which the present control system is incorporated.
Figure 2:
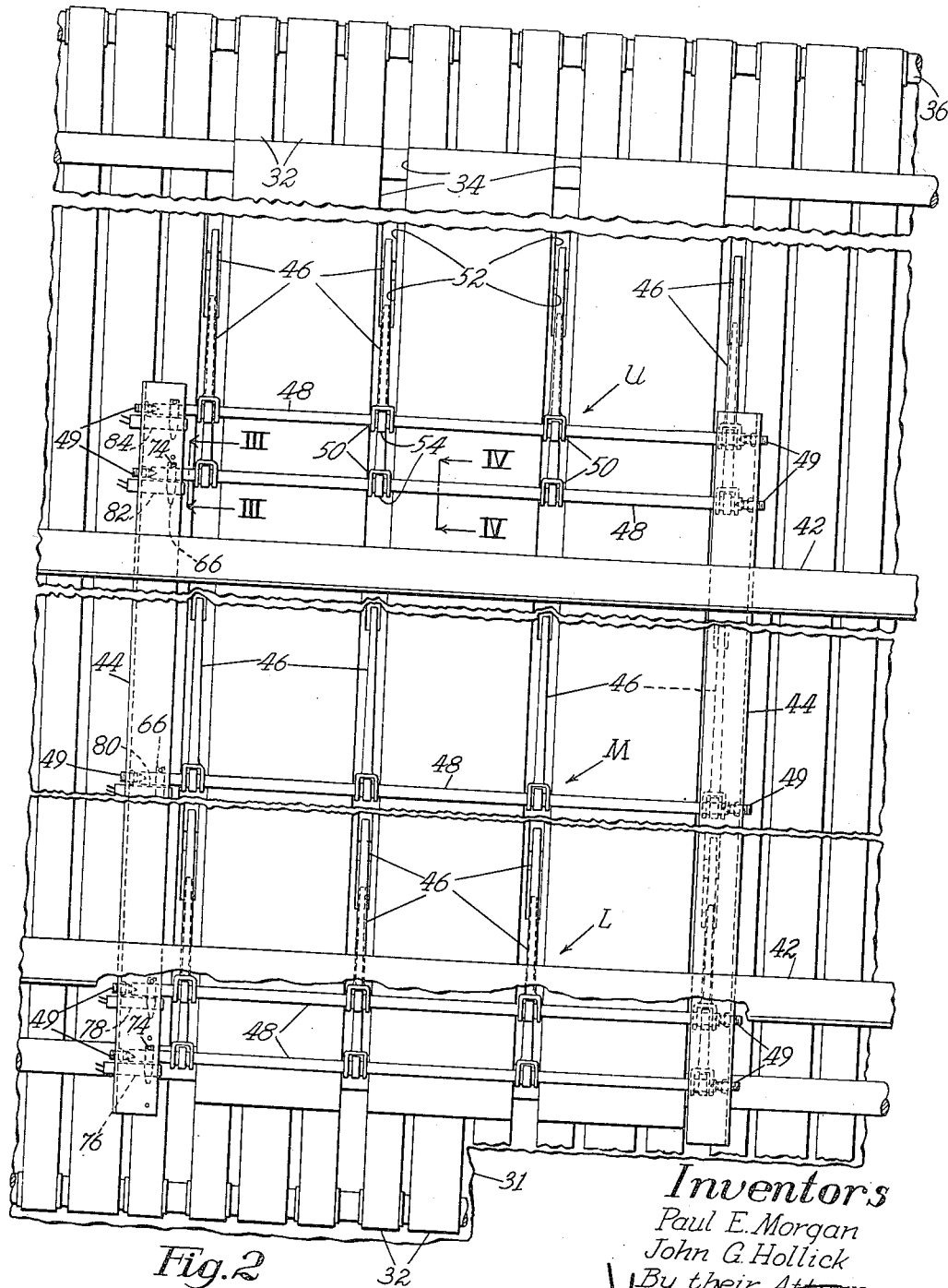
Fig. 2 is a partial view on an enlarged scale of the leather stacking machine and detector stations taken in the direction of the arrow A in Fig. 1.

The stations L, M and U are supported on the conveyor frame in the following manner. Members 40 are secured to the sides of the frame 30 and normal to the platform 31. An angle member 42 extends between each member 40 and a second pair of angle members 44 are secured to the members 42 (Figs. 1 and 2).

Each detector station comprises fingers 46 (Figs. 4 and 5 illustrating a representative finger) and each finger 46 is pivotally mounted upon a hollow shaft 48 by ears 50 integral with the finger. Each shaft 48 extends transversely across the machine and is freely mounted on pivot screws 49 threaded into each angular member 44 (Fig. 2). The body of each finger is of T cross section and tapers towards its lower end which lies in a recess 52 formed in the platform 31. A block 54 is provided between each of the ears 50 and is held in non-rotatable relation to the shaft 48 by a dog point screw 56. A pin 58 passes through the block 54 and bears against the inside of each ear 50. Thus when the position of the block 54 is established by the dog point screw 56, the finger 46 may be adjusted laterally so that its lower end will aline properly with the recess 52 this position being maintained by tightening a screw 60 threaded in the block 54. A screw 62 is threaded into the body of the detector finger 46 and extends just short of the bottom of the block 54 and is held in that position by a check nut 64. It is evident that when the finger 46 is lifted as by the passage of a work piece the screw 62 will strike the block 54 thereby imparting a rotational movement to the shaft 48 but that rotational movement of the shaft 48 will not impart any motion to the finger 46. At the left-hand end of each shaft 48 an arm 66 is secured by a dog point screw 68 which maintains a switch button 70 in its depressed position through the yieldable action of the spring 72 which overcomes the internal spring pressure of the switch. With this arrangement a minimum force is required to lift any finger 46 to rotate the shaft 48 thereby allowing the switch button 70 to assume its normal position under the action of the internal spring thereby making or breaking a contact in said switch. A stop screw 74 is threaded into the angle member 44 and is arranged to bear against a portion of the arm 66 thus limiting the rotational movement of the fingers 46 which are lowermost in a pair. In this manner it is possible to limit the upward movement of the fingers and prevent them from becoming fouled when a curled work piece passes through the machine.

The lower station L comprises four pairs of fingers 46 (Figs. 1 and 2) arranged to operate switches 76, 78. The middle detector station M comprises four fingers 46 arranged to operate the switch 80 while the upper detector station comprises four pairs of fingers 46 arranged to operate switches 82, 84. The electrical circuits controlled by these switches will be described below. The detector stations are arranged to actuate a control mechanism. The control mechanism herein disclosed is not claimed herein but is the subject of a separate application Serial No. 376,623, filed on August 26, 1953, in the name of John J. Maciejowski. This control mechanism is described only by way of illustration and the utility of the present invention is not limited thereto.

The control mechanism CM is secured to the right-hand side of the frame 30. Two screws 96 support a bracket 98 against the side of the frame 30 and the main frame 100 of the control mechanism CM is fastened to the top of said bracket (Figs. 1 and 7). Power is supplied to this control mechanism by a belt 86 connecting a pulley 88 secured to a driven conveyor belt roll 90 and a pulley 92 secured to a shaft 94 of said control mechanism, the shaft 94 thus being continuously rotated. The shaft 94 is journaled in a lug 102 formed on the frame 100 and a beveled gear 104 is secured on its inner end which meshes with a second beveled gear 106 secured to a vertical shaft 108. The shaft 108 is journaled in the frame 100 and in an extension 110 of the lug 102 on its lower end portion two gears 112, 114 are secured. A vertical shaft 116 arranged parallel to the shaft 108 is journaled in upper and lower portions of the frame 100. A cup-shaped member 118 is rotatably mounted upon said shaft and has an annular gear 119 which meshes with the gear 114. A member 120 is likewise freely mounted on the shaft 116 and has formed integral therewith a gear 122 which meshes with the gear 112. Ratchet teeth 123 are formed on the upper radial face of the member 120. It will be seen that the cup-shaped member 118 and the member 120 are being constantly driven in opposite directions of rotation and that the arrangement of the gearing is such that they are traveling at equal rates of speed. Three rolls 124 are mounted on a bracket 126 which is also rotatably mounted on the shaft 116. The rolls 124 bear against a surface 128 formed on the member 118 thereby providing adequate bearing support for said member. A collar 130 (Fig. 9) is secured to the shaft 116 by a pin 132 and bears against the upper surface of the member 120. One end of a spiral torsion spring 134 is secured to the upper end of the shaft 116 by a screw 135. The other end of said spring is secured to a pin 136 inserted in the frame 100. Also attached to the upper end of the shaft 116 by a binding screw 138 is a cup-shaped member 140 having a lug 142 arranged to bear against a resilient pad 144 secured to the upper surface of the frame 100 under the action of the spring 134.

Pivotally connected to the collar 130 on a pin 145 is an angular member 146 having a bifurcated section 148 extending on either side of said collar and bearing against the underside of a flanged collar 150 which is slidably mounted on the shaft 116 (Figs. 8 and 12). Said flanged member has a slot 151 formed on its lower portion which receives corresponding lugs 153 formed on the collar 130. Thus the flanged member 150 rotates with the collar 130 while it may also move axially thereto. A collar 154 is pinned to the shaft 116 and a spring 152 acting between it and the upper surface of the flange maintains the member 150 and the angular member 146 in their downward positions, the downward position of the member 150 being limited by the collar 130. On the lower portion of the member 146 a tooth 156 is formed which when the mechanism is in its rest position (Fig. 8) bears against the underside of a corresponding tooth 158 formed on a timing arm 160 (Figs. 8 and 11), a bifurcated section 161 of which is pivotally connected to the collar 130 at 162.

A toothed pin or pawl 164 having the same form as the teeth 123 is yieldably mounted in the arm 160 (Fig. 10). Rotational movement of the member 164 is prevented by a pin 166 extending through a boss 168 formed on the arm 160 and extending through a slot 170 formed in the pawl 164. A compression spring 172 normally holds said member in a downward position which is limited by the slot 170.

An arm-engaging solenoid 174 is mounted by four screws 176 (Figs. 6 and 8), only two of which are seen, to lugs on the frame 100. A link 178 pivotally connects the solenoid plunger to an arm-engaging lever 180 pivotally connected to the frame 100 by a pin 181 which is normally held in its upper position by a tension spring 182, its upper position being limited by the stop screw 184.

It can be seen (Fig. 6) that the angular position of the arm 160 is controlled by the lug 142 bearing against the resilient pad 144 under the action of the spring 134. In this position the arm 160 is located immediately beneath the lever 180. Upon activation of the solenoid 174 the lever 180 causes the arm 160 to be pivoted downwardly around the pivot point 162. During this motion the spring 172 is compressed and the pawl 164 is brought into engagement with the rotating member 120. Also during this downward movement of the arm 160 the member 146 is pivoted in a counterclockwise direction as viewed in Fig. 8 by the camming action of the teeth 158, 156. By this rotational movement the flanged member 150 is raised compressing the spring 152. Continued downward motion of the arm 160 causes the tooth 156 formed on the member 146 to bear against the upper surface of the corresponding tooth 158. Thus the arm 160 is held in positive engagement with the member 120 by the spring 152 which also maintains the spring 172 in a compressed condition.

A microswitch 186 is mounted on a projection 187 of the frame 100 with its plunger 188 extending into a slot 190 (Fig. 7a) formed on the flanged member 150. The flanged member 150 which is arranged to rotate with the collar 130 is so oriented that when the arm 160 is in its start position as shown in Fig. 8 the slot 190 is beneath the plunger 188. When the arm 160 is engaged with the member 120 and the angular member 146 rotates lifting the flanged member 150 the plunger 188 will not be depressed. As the arm 160 begins its motion, the plunger 188 is raised by a camming surface 192 (Fig. 7a). The plunger then rides on the upper surface of the flanged member 150 but has not been raised sufficiently to close the contacts of the microswitch 186.

Figure 6:
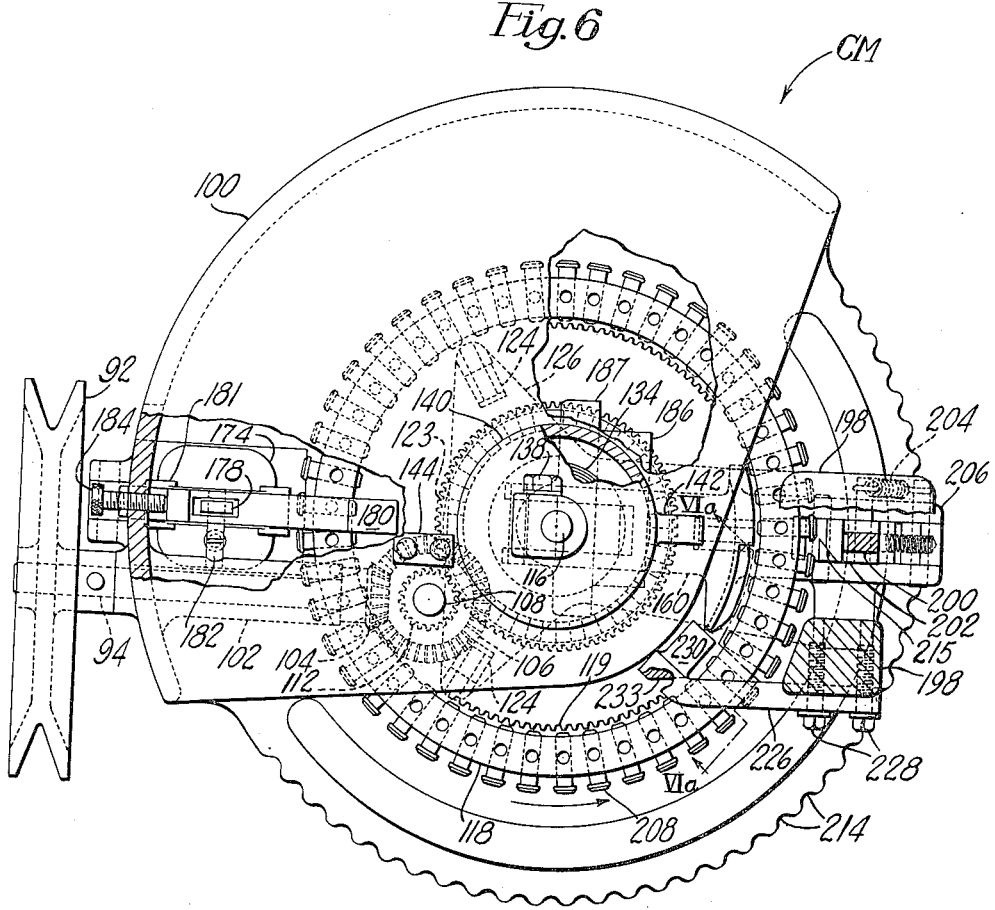
Fig. 6 is a plan view on an enlarged scale of the control mechanism shown in phantom in Fig. 1.

A pin punching solenoid 194 is mounted by four screws 196 to the bottom surface of an inverted L-shaped projection 198 extending from the bracket 126 (Figs. 6, 7 and 8). A link 200 extending from the plunger of the solenoid 194 is pivotally connected to a bifurcated end of a bell crank 202 which is in turn pivotally connected to the bracket 126. The plunger and link 200 are normally held in their downward position by a tension spring 204 connected between the bell crank 202 and a lug 206 formed on the bracket 126. A multiplicity of headed pins 208 are slidably mounted in the upper portion of the cup-shaped member 118 arranged at spaced intervals with their axes extending radially of the center of said cup-shaped member (Fig. 6). Each pin 208 has two grooves 210 which are arranged alternately to receive a rounded plunger 212 which is yieldingly pressed therein by a spring 213 (Fig. 16). The pins are normally in the position shown in Fig. 8 with the plunger engaging the innermost groove. The upper end of the bell crank 202 is arranged adjacent to the path of travel of the pins 208. Upon activation of the solenoid 194 the bell crank 202 rotates in a counterclockwise direction as viewed in Fig. 8, engaging the pins 208 and displacing them inwardly so long as the solenoid 194 is activated, the camming surface 215 on the upper end of the bell crank (Fig. 6) preventing jamming of the pins. The pins 208 are held in this displaced position by the plunger 212 resting in the outermost groove 210.

The angular position of the pin punching solenoid 194 and the bracket 126 is adjustable in the following manner for reasons which will be described presently. A series of notches 214 is formed around the periphery of the lower wall of the frame 100. A lever 216 is pivotally connected to the lug 206 on the bracket 126 and is held in engagement with one of said notches 214 by a compression spring 218. When it is desired to change the position of the solenoid 194 an operator manually disengages the lever 216 and rotates the bracket 126 about the shaft 116. A lug 220 formed on the bracket 126 bears against the frame 100 providing an outboard support for said bracket.

Figure 6A:
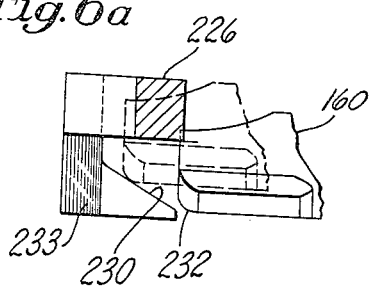
Fig. 6a is a view taken on the line VIa—VIa in Fig. 6 on a further enlarged scale showing the operating relationship of certain elements shown.

Extending above the cup-shaped member 118 is a safety arm 226 which is secured to the upright portion of the projection 198 by two bolts 228 (Fig. 6). A camming surface 230 is formed on the other end of the arm 226 which extends beneath the upper surface of the member 118 and into the path of travel of the timing arm 160 and is adapted to engage a corner portion 232 thereof (Fig. 6a) for purposes to be described shortly.

The electrical circuit used herein is relatively simple utilizing the standard electrical components of well known character and is diagrammatically depicted in Fig. 23. Power is supplied from the main lines L1, L2. One circuit flows from the line L1 through the switches 80, 78 and 76 through the coil of the pin punching solenoid 194 and then back to the line L2. A second circuit is arranged to flow from the line L1 through the switches 80, 82 and 84 through the coil of the arm-engaging solenoid 174 and then back to the line L2. A third circuit is arranged to flow from the line L1 through the coil of a relay K1 through the switch 186 and back to the line L2. A fourth circuit is arranged to flow from the line L3 through the contactors $k1$ to the coil of the solenoid S and the contactors $k2$ to the line L4.

As was previously stated the operation of the present timing device is based upon the principles of operation disclosed in the above-mentioned Patent No. 2,743,925.

Briefly, the mentioned principles comprise the variation of a quantity by two elements actuated independently by the sensings of selected detector stations along a conveyor system which determine the passage of the leading and trailing edges of a conveyed work piece, the rate of the element actuated by the trailing edge detector station being in the same ratio to the rate of the conveyed work piece as a fixed amount of the quantity is to the distance between the detector stations whereby when the quantity has been varied to a fixed amount a selected intermediate portion of the work piece has arrived at a fixed point in relation to the machine. In the present case the angular distance between the starting position of the arm 160 and the pin pushing bell crank 202 represents that quantity. The pulley and gearing arrangement is such that both a displaced pin and the arm, when engaged, will move at a rate in the above designated ratio to vary or exhaust the distance between them. When the pin and the arm meet then the midpoint of the work piece is at a fixed point in relation to the machine dependent on the angular adjustment of the bracket 126 through the range indicated by the notches 214. The arm and the pins are traveling in a fixed ratio to the movement of the work piece and because their driving means are connected directly to the conveyor drive by the belt 86 this ratio will be maintained at all times. If the quantity to be varied were represented by some other condition, the features of this invention would apply if the varying means were made directly dependent on the conveyor means.

The following arrangement has been provided in order to overcome the false cycling which will be obtained particularly by so-called hook necked work pieces, that is work pieces or hides which have slots formed therein caused during the butchering of the animal. This type of work piece is represented in Fig. 26. The leading large portion of the work piece represents the head of an animal. The slot formed therein has been caused during the butchering of the animal. The lower detector station L is arranged to sense the passage of a trailing edge in a manner to be described shortly. As can be seen in Fig. 26, if a work piece were presented to the machine it would appear to the detectors of the lower station L that an independent work piece had passed by, since the narrow section of leather can be easily passed between the spaced fingers. Therefore all of the lower fingers will be in a downward position as they would be when the trailing edge of a work piece has gone by. Similarly as can be seen in Fig. 27 all of the uppermost fingers of the station U are in a downward position indicating the passage of a leading edge when in fact a second work piece has not yet been presented. To overcome this problem the detector station M has been provided. Referring now to Fig. 24 it will be seen that a work piece of normal configuration is passing up the conveyor slope. When the leading edge of the work piece arrives at the upper station U one or more of the lower fingers 46 will be raised momentarily closing the circuit flowing through the switches 84, 82 and 80. A short time thereafter the upper fingers of the station U will be raised opening the switch 84 and breaking said circuit. A short pulse of current may at that time flow through the circuit giving an indication of the passage of the leading edge. It will be noted that the switch 80 is closed because the body of the work piece is beneath the finger of the station M. In Fig. 25 the operation of the lower station L is illustrated. As the work piece W is conveyed along the conveyor, the lower set of fingers of the station L drop off of the rear edge of the work piece closing the switch 76 allowing the circuit flowing through the switches 76, 78 and 80 to be completed momentarily. A short time thereafter the switch 78 is opened when the trailing edge passes beyond the upper fingers of the station L. This momentary completion of the detection circuit gives an indication or sensing as to the time when the trailing edge passes the lower station L. It will again be noted that the main portion of the work piece is beneath the station M thereby closing the switch.

Referring now to Figs. 26 and 27 it is evident that even though the switches of the stations L and U may assume the same relation as when the leading or trailing edge of a work piece passes up the conveyor as seen in Figs. 23 and 24 neither circuit may be completed through the respective switches 76, 78 and 80 or 80, 82 and 84 because in each instance the main portion of the work piece is not beneath the station M and in both instances the switch 80 is opened. This of course limits the minimum length of work piece to the distance between the stations L and M or M and U. However, the problem of hooked necks exists mainly in large work pieces and if it is desired to operate the machine for smaller work pieces the switch 80 may be physically locked in a closed position. The stations L and U would then selectively detect the leading and trailing edges in the manner previously described.

When the circuit flowing through the upper detector station is completed upon the passage of a work piece, the solenoid 174 is activated and the arm 160 is brought into engagement with the rotating member 120 causing the arm to be rotated in a clockwise direction (Fig. 6). When the trailing edge of a work piece is properly detected by the lower station L and the solenoid 194 is activated, one to four pins 208 are displaced inwardly, the first or leading pin being representative of the trailing edge of the work piece. The pins thereupon travel in a counterclockwise direction (Fig. 6) towards the arm 160. The relation of the pins and the arm when they first approach each other is shown in Fig. 13 with their relative rates being indicated by the arrows. The leading pin designated P strikes a camming surface 222 formed on the end of the arm 160 thereby raising the arm 160 about the pivot point 162 so that the pin P travels for a short time around a flat 224 as is seen in Fig. 14. This initial raising of the arm 160 causes the parts to assume the relationship shown in Fig. 19 in which position the member 146 has reached the maximum limit of rotation and the flanged member 150 has likewise been raised its maximum amount thereby completing the circuit through the switch 186 causing the relay K1 to close and activate the solenoid S thereby initiating the above-mentioned hydraulic circuit to cause the arm 38 to be oscillated in proper time relationship, thus stacking the work piece W equally on either side of the horse H.

During the first upward movement of the arm 160 it continues to be driven by the member 120 due to the fact that the pawl 164 is continued in engagement with the member 120 by the action of the spring 172 assuming the relationship shown in Fig. 18 with the pin 166 engaging the upper end of the slot 170. Continued relative movement of the arm 160 and the pin P causes the pin P to strike the cam surface 225 as is seen in Fig. 14 thereby raising the arm 160 to the position shown in Figs. 15 and 20. The tooth 156 is now acting on the underside of the tooth 158 and under the action of the spring 152 positively holds the arm 160 in its disengaged position as seen in Fig. 8. At this point the pins 208 continue rotating but the arm 160 momentarily has no motion until it starts to return to its original position under the action of the spring 134.

It is of great importance that all of the displaced pins 208 be returned to their original or outer positions as seen in Fig. 8 before a second signal, caused by the passage of the leading edge of a work piece beneath the upper detector station, activates the solenoid 174 thereby causing the arm 160 again to become engaged with the member 120. Cam surfaces 229, 231 are provided on the end of the arm 160 for that purpose. During the rising motion of the member 160 caused by the cam surface 222 and 226, pins 208, which are behind the leading pin P, are returned to their original position by the surface 229 the action of which is indicated in Fig. 16. After the arm 160 has been disengaged by the cam surface 225 it rotates in the same direction as the pins P under the action of the torsion spring 134 but at a greater rate of speed. Figs. 15 and 22 show the arm 160 at the moment it has been disengaged from the member 120 and before it has started its reversed rotation under the action of said torsion spring. Fig. 22 shows that the cam surface 231 is located so that as the arm 160 attains a speed greater than that of the pins 208 said surface will erase or displace these pins to their outer position. In a case where the arm 160 travels only a short distance and the surface 231 is ineffective a further cam surface on the safety arm 226 returns the displaced pins (Fig. 6).

Safety means are provided to prevent the switch 186 from cycling the machine as one or more of the pins 208 are inadvertently displaced inwardly. The surface 231 formed on the arm 160 is in the path of travel of the pins 208 in its upper position as seen in Fig. 8. The pins will automatically be canceled or are returned to their original position if inadvertently displaced. A further safety provision is provided for the case where the arm 160 might inadvertently be engaged with the member 120. The camming surface 230 on the arm 226 automatically disengages the timing arm 160 where no pin 208 is displaced and it is returned to its starting position under the action of the torsion spring 134.

Having thus described our invention, what we claim as new and desire to secure by Letters Patent of the United States is:

1. In a work treating machine having work treating means and conveyor means, a control system comprising three detector stations spaced apart along said conveyor, the first and second of said stations being arranged selectively to detect the passage of the leading and trailing edges respectively of a conveyed work piece, the third of said stations being interposed between the first and second stations and operative in series with each of said stations to prevent false detection of intermediate edges of irregularly shaped work pieces, and a control mechanism actuated in response to the detections made by said stations for operating the work treating means in proper time relationship to the passage of a conveyed work piece.

2. In a work treating machine, the combination with work treating means, conveyor means, and a control mechanism actuating the work treating means, of a control system for actuating the control mechanism comprising first and second detector stations spaced apart along said conveyor means, a third detector station interposed between said first and second stations, electrical switches in said detector stations, and detector fingers spaced across the conveyor means which are associated with each of said switches and arranged to operate the associated switch in response to the passage of a conveyed work piece, said first station having two switches one of which is normally open and the other normally closed, said second station having two switches one of which is normally closed and the other of which is normally open in reverse order of the arrangement in said first station, said third station having a single switch which is normally open and which is connected in series with both the switches of the upper and lower detector stations whereby circuits may be completed through said switches to indicate the passage of the leading and trailing edges of a conveyed work piece only when a portion of such work piece is beneath the intermediate detector station.

3. A conveyor system having means for conveying sheet-like work pieces which have leading and trailing edges, means for detecting the passage of the work piece edges, and means operative in response to detection of the passage of a work piece edge for treating the detected work piece, said edge detection means including a shaft mounted above the conveyor means with its axis normal to the path of travel of the conveyed work piece, a detector finger rotatably carried by said shaft and extending into the path of travel of conveyed work pieces whereby the finger is displaced by the passage of a work piece edge, an arm secured to said shaft and in the path of movement of said finger whereby displacement of the finger due to the passage of one edge of the work piece imparts rotational movement to the shaft, a switch having a plunger which is operated to indicate the passage of a work piece edge, and a switch arm secured to said shaft, said switch being mounted relative to said shaft so that the switch arm normally depresses the switch plunger and so that rotation of the shaft in response to displacement of the finger causes the switch arm to move away from the switch.

4. A conveyor system having means for conveying sheet-like work pieces which have leading and trailing edges, means for indicating the passage of a work piece edge, and means operative in response to the detection of the work piece edge for treating the detected work piece, said edge detection means including a shaft mounted above the conveyor means with its axis normal to the path of travel of conveyed work pieces, a plurality of detector fingers rotatably mounted on said shaft and extending into the path of travel of conveyed work pieces whereby each finger will be displaced by the passage of a work piece edge thereby, an arm associated with each finger and attached to said shaft so that it extends into the path of movement of its associated finger whereby displacement of any one finger due to the passage of one edge of a conveyed work piece will impart rotational movement to the shaft, a switch having a plunger which is operated to indicate the passage of a work piece edge and a switch arm secured to said switch, said switch being mounted relative to said shaft so that the switch arm normally depresses the switch plunger and so that rotation of the shaft in response to the displacement of a finger causes the switch arm to move away from the switch.

5. A conveyor system having means for conveying sheet-like work pieces which have leading and trailing edges, means for detecting the passage of a work piece edge, means operative in response to the detection of the work piece edge for treating the detected work piece, said edge detection means including a hollow shaft mounted above the conveyor means with its axis normal to the path of travel of the conveyed work pieces, a plurality of detector fingers mounted on said shaft, each of said fingers having at one end a bifurcated portion freely mounted on said shaft and having its other end extending into the path of travel of the conveyed work pieces whereby each finger will be displaced by the passage of a work piece edge thereby, an arm associated with each finger, each of said arms being mounted on said shaft within the bifurcated portions of its associated finger and extending into the path of movement of the finger, the arm mounting means comprising a dog point screw threaded into the arm with the dog point extending into a hole in said shaft thereby fixedly securing the arm to the shaft without causing distortion of the shaft, a switch having a plunger which is operated to indicate the passage of a work piece edge, and a switch arm secured to said shaft, said switch being mounted relative to said shaft so that the switch arm normally depresses the switch plunger and so that rotation of the shaft in response to displacement of any finger causes the switch arm to move away from the switch.

References Cited in the file of this patent

UNITED STATES PATENTS

| | | |
|---|---|---|
| 567,303 | Dexter | Sept. 8, 1896 |
| 623,770 | Dexter | Apr. 25, 1899 |
| 2,318,132 | Welk | May 4, 1943 |